(12) United States Patent
Nakazawa et al.

(10) Patent No.: US 7,212,107 B2
(45) Date of Patent: May 1, 2007

(54) ODOMETER SYSTEM AND METHOD FOR A VEHICLE

(75) Inventors: Yoshihiro Nakazawa, Saitama (JP); Ryota Umetani, Saitama (JP); Tetsuya Kondo, Saitama (JP); Koji Kano, Saitama (JP); Shigeru Kodaira, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 203 days.

(21) Appl. No.: 11/040,455

(22) Filed: Jan. 21, 2005

(65) Prior Publication Data

US 2005/0165523 A1 Jul. 28, 2005

(30) Foreign Application Priority Data

Jan. 27, 2004 (JP) ............... 2004-018134

(51) Int. Cl.
*B60Q 1/54* (2006.01)
(52) U.S. Cl. ............ 340/466; 340/425.5; 340/438; 340/439; 340/441; 340/973; 340/995.27
(58) Field of Classification Search ........ 340/466, 340/425.5, 439, 441, 815.4, 815.44, 973, 340/995.27; 701/1, 29, 31, 33, 35
See application file for complete search history.

(56) References Cited

U.S. PATENT DOCUMENTS 4,642,787 A * 2/1987 McCarthy et al. .......... 702/165

| | | |
|---|---|---|
| 4,803,707 A | 2/1989 | Cordan, Jr. |
| 6,188,972 B1 | 2/2001 | Kobayashi et al. |

FOREIGN PATENT DOCUMENTS

| | | |
|---|---|---|
| EP | 0274045 | 7/1988 |
| JP | 11118509 A | 4/1999 |

* cited by examiner

*Primary Examiner*—Hung Nguyen
(74) *Attorney, Agent, or Firm*—Carrier, Blackman & Associates, P.C.; Joseph P. Carrier; William D. Blackman

(57) ABSTRACT

A mileage display system includes a control unit operatively connected to an ignition switch of a motorcycle that obtains the accumulated mileage by accumulating a pulse signal produced according to running of the motorcycle. The control unit records odometer data in an EEPROM. The control unit also reads the odometer data recorded in the EEPROM when the ignition switch is operated. If the odometer data exceeds the maximum value to be displayed on an odometer (for example, 99999), the control unit displays on the odometer for a predetermined period of time a numeric value of digits of higher order than the predetermined number of display digits of the odometer data. The mileage display system displays an accurate, accumulated distance traveled or accumulated mileage, after the mileage overflows by exceeding a maximum display value as established by a predetermined number of display digits.

21 Claims, 9 Drawing Sheets

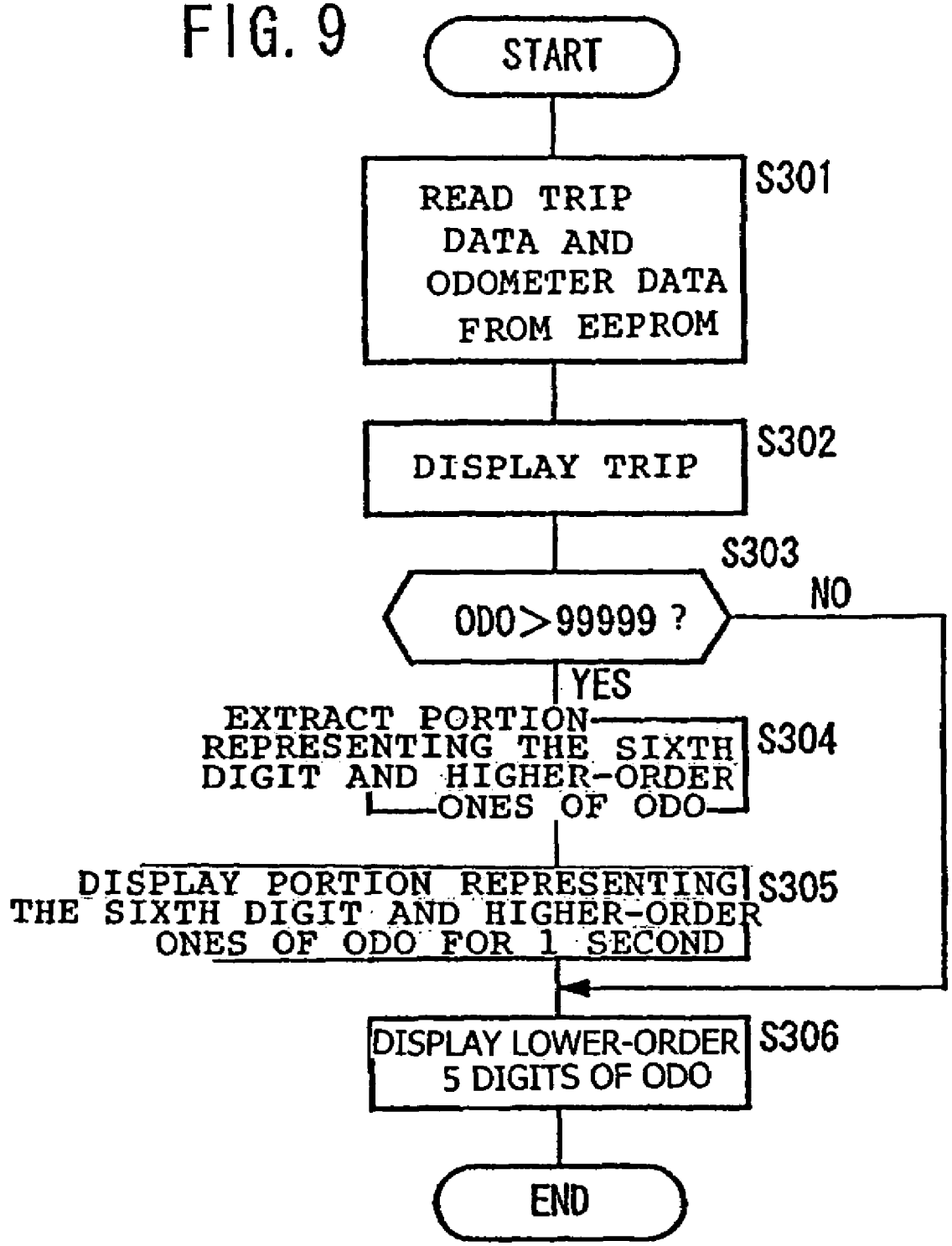

ODOMETER SYSTEM AND METHOD FOR A VEHICLE

CROSS-REFERENCE TO RELATED APPLICATIONS

The present invention claims priority under 35 USC 119 based on Japanese patent application No. 2004-018134, filed on Jan. 27, 2004. The subject matter of this priority document is incorporated by reference herein.

BACKGROUND OF THE INVENTION

1. Field of the Invention

The present invention relates generally to a mileage display system for a vehicle which is capable of displaying an accumulated distance traveled by a vehicle, or an accumulated mileage, using a predetermined number of display digits on a display. More particularly, the present invention relates to a mileage display system for displaying the accumulated mileage by accumulating a pulse signal generated according to running of the vehicle.

2. Description of the Background Art

Electronic mileage display systems have a maximum display value that is established by the predetermined number of display digits. Conventionally, a mileage display system for a vehicle automatically restarts from zero when the mileage overflows by exceeding the maximum display value. In such instances, accurate mileage is thus unknown. This is inconvenient when evaluating a used vehicle for purchase, or when determining appropriate timing of parts replacement and or other maintenance matters.

The mileage display system commonly found in motorcycles has a fewer number of display digits than that found in four-wheel motor vehicles. For example, only five digits are displayed. If the motorcycles are heavily used, however, a mileage display overflow can occur. In some countries, motorcycles are used for business purposes such as providing bike taxies and may also be used for other special purposes. In such cases, the mileage display overflow is more likely to occur. Nonetheless, such applications of the motorcycles account for a very small percentage of the total number of motorcycles in operation. It is therefore highly unreasonable to modify the display by increasing the number of displayed digits of the accumulated mileage.

In view of the foregoing, an accumulating device or an integrator is proposed for use in mileage displays. Such a device is disclosed in Japanese Patent Laid-open No. Hei 11-118509. In Japanese Patent Laid-open No. Hei 11-118509, the integrator operates on either one of the following modes: specifically, a first integration mode, in which, when an overflow occurs, subsequent integration is suspended; and a second integration mode, in which, when an overflow occurs, only low-order digits of the mileage are displayed, flashing off and on.

In the first integration mode of the integrator described in Japanese Patent Laid-open No. Hei 11-118509, a function as the mileage display system is lost in order to suspend integration following the overflow. In the second integration mode, the low-order digits of the mileage are displayed, continuously flashing off and on. This makes the display unnecessarily prominent, thus obstructing a view of a rider. In addition, the simple blink display does not provide the number of overflows that have so far occurred.

In view of the foregoing problems in the conventional art, the object of the present invention is to provide a mileage display system which, after the mileage overflows by exceeding the maximum display value as established by a predetermined number of display digits, is capable of simply displaying an accurate, accumulated distance traveled or accumulated mileage.

SUMMARY OF THE INVENTION

To achieve the foregoing object, according to a first aspect of the present invention, there is provided a mileage display system that includes a main odometer capable of displaying a predetermined number of display digits. The main odometer displays an accumulated distance traveled by a vehicle, or an accumulated mileage. The mileage display system includes an display controller operatively connected to a main switch of the vehicle. The display controller obtains the accumulated mileage by accumulating a pulse signal produced according to running of the vehicle. The display controller records the accumulated mileage in a predetermined recording unit. In addition, if the accumulated mileage recorded in the recording unit exceeds a maximum value of display, as established by the predetermined number of display digits, when the main switch is operated, the display controller displays on the main odometer, for a predetermined period of time, a numeric value of digits of higher order than the predetermined number of display digits of the accumulated mileage.

For the accumulated mileage, the numeric value of the digits of higher order than the predetermined number of display digits is displayed on the main odometer. This arrangement allows an accurate value of the accumulated mileage to be recognized. Moreover, the display of the numeric value is brief, lasting for only the predetermined period of time after the main switch has been operated.

According to a second aspect of the present invention, there is provided a mileage display system that includes a main odometer capable of displaying a predetermined number of display digits. The main odometer displays an accumulated distance traveled by a vehicle, or an accumulated mileage. The mileage display system also includes a trip odometer and an display controller. A reading of the accumulated mileage on the trip odometer is reset to zero when a reset switch is operated. The display controller is operatively connected to a main switch of the vehicle and obtains the accumulated mileage by accumulating a pulse signal produced according to running of the vehicle. The display controller records the accumulated mileage in a predetermined recording unit. In addition, if the reset switch is simultaneously operated and the accumulated mileage recorded in the recording unit exceeds a maximum value of display as established by the predetermined number of display digits when the main switch is operated, the display controller displays on the main odometer, for a predetermined period of time, a numeric value of digits of higher order than the predetermined number of display digits of the accumulated mileage.

For the accumulated mileage, the numeric value of the digits of higher order than the predetermined number of display digits is displayed on the main odometer. This arrangement allows an accurate value of the accumulated mileage to be recognized. Alternatively, the display of the numeric value is brief, lasting for only the predetermined period of time when the reset switch is operated at the same time that the main switch is operated. Thus, the operator is provided with a choice to display or not to display the numeric value.

Herein, the display controller may, after the lapse of the predetermined period of time, display on the main odometer a numeric value corresponding to the low-order digits according to the predetermined number of display digits of the accumulated mileage. Thereafter, the display controller can continue accumulating the mileage and display the low-order value on the main odometer.

Alternatively, the display controller may display on the main odometer both the numeric value of the digits of higher order than the predetermined number of display digits, and the numeric value corresponding to the low-order digits according to the predetermined number of display digits, in an alternating manner, a predetermined number of times.

Further, the display controller may display on the main odometer a value of the accumulated mileage that scrolls from the highest-order digit toward lower-order digits. This will help an operator recognize the accumulated mileage since the entire value of the milage is displayed at once.

In the mileage display system according to the present invention, after the accumulated mileage overflows by exceeding the maximum display value, for the accumulated mileage, the numeric value of the digits of higher order than the predetermined number of display digits is displayed on the main odometer for the predetermined period of time. Accordingly, the number of times the overflow has occurred can be displayed. Moreover, the display provided is simple and does not obstruct the view of the operator.

In addition, the main odometer is used for this display, thus requiring no additional meters or display digits.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

BRIEF DESCRIPTION OF THE DRAWINGS

FIG. 9 is a flowchart showing an initial processing operation performed when the mileage display system operates according to a third program.

DETAILED DESCRIPTION OF THE INVENTION

A mileage display system according to a preferred embodiment of the present invention will be described with reference to the accompanying drawings of FIGS. 1 through 9.

Figure 1:
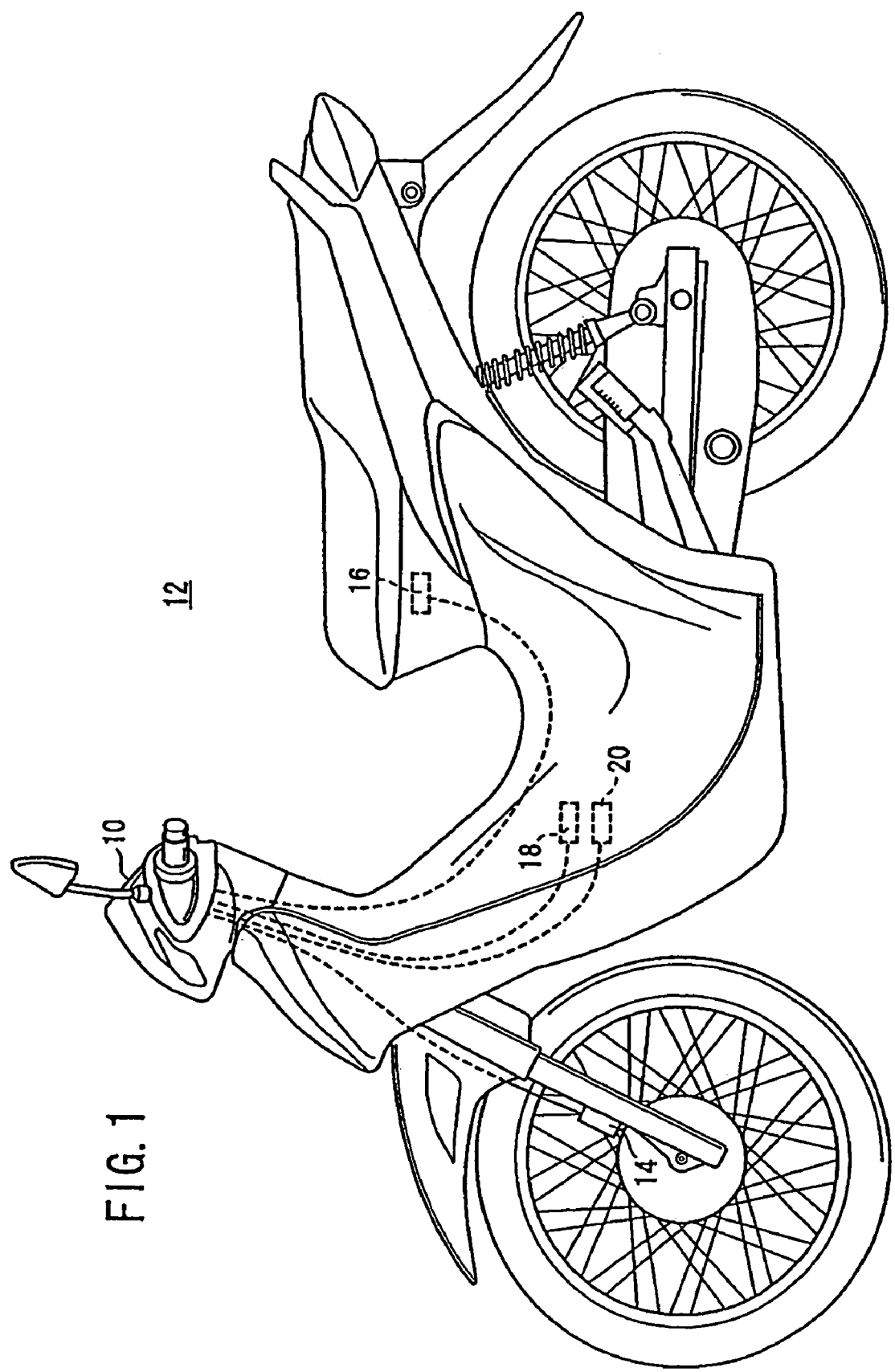
FIG. 1 is a side elevational view of a motorcycle showing schematically a mileage display system according to a preferred embodiment of the present invention.

Referring to FIG. 1, a mileage display system 10 according to the preferred embodiment of the present invention is an instrument panel disposed near a handlebar in a motorcycle 12. A speed sensor 14 generating a pulse signal according to rotation of an axle, a fuel sensor 16, an engine oil temperature sensor 18, an engine speed sensor 20, and the like are connected to the mileage display system 10.

Figure 2:
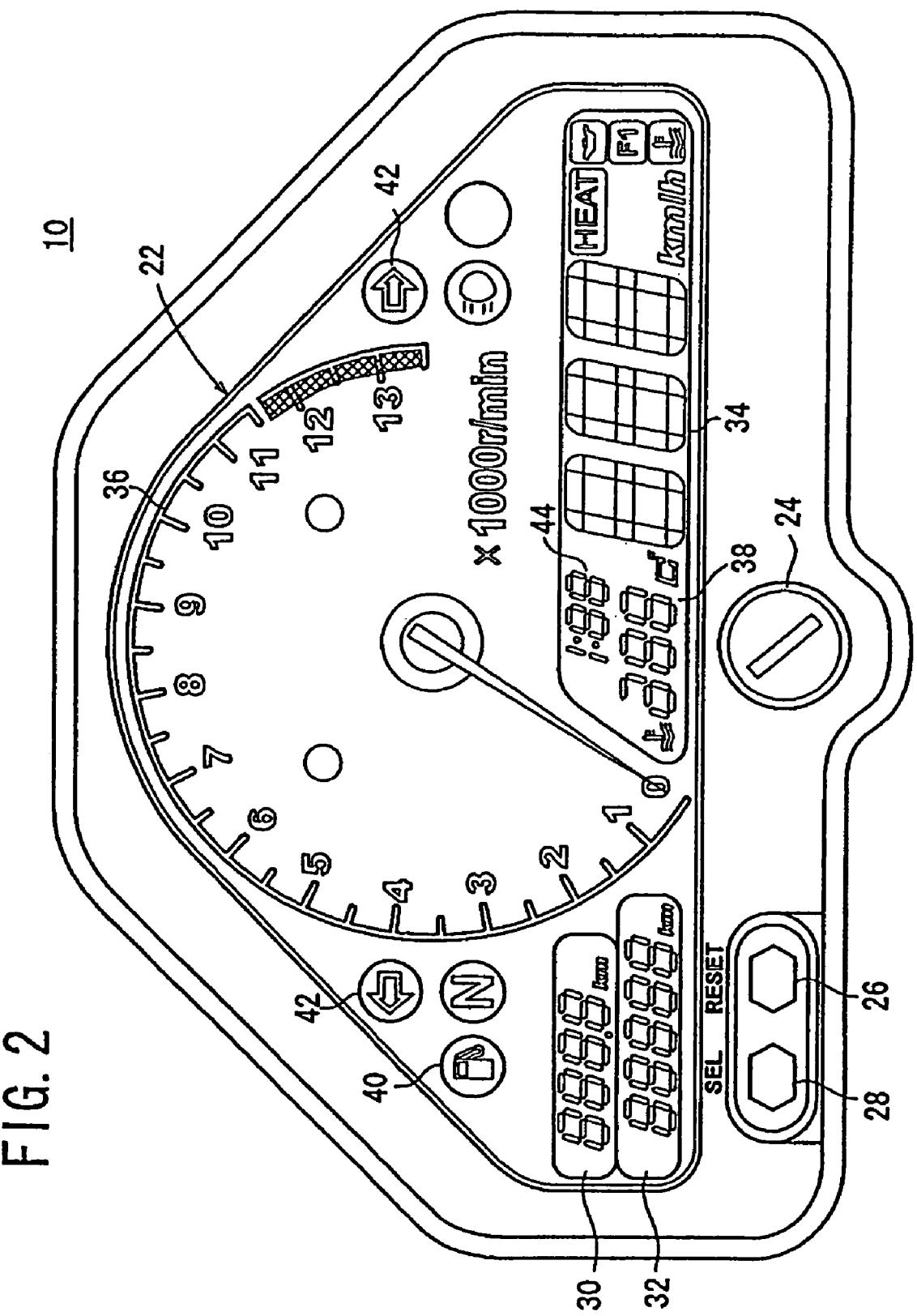
FIG. 2 is a plan view of the display unit of the mileage display system according to the preferred embodiment of the present invention showing an arrangement of the main odometer or odometer, the trip odometer or trip meter, the speedometer, and a reset switch.

Referring to FIG. 2, the mileage display system 10 includes a display unit 22, an ignition switch (main switch) 24, a reset switch 26, and a select switch 28. The display unit 22 is disposed at a location easily visible by an operator such as a rider, a service technician, or the like. The reset switch 26 resets the display of a trip meter 30. In the subsequent description, the trip meter 30 is also referred to as a trip odometer.

The display unit 22 includes the trip meter 30, an odometer 32, a speedometer 34, and a tachometer 36. The odometer 32 displays the accumulated mileage. In the subsequent description, the odometer 32 is also referred to as the main odometer. The speedometer 34 displays a vehicle speed based on a signal provided by the speed sensor 14. The tachometer 36 displays an engine speed based on a signal provided by the engine speed sensor 20.

The display unit 22 further includes an engine oil temperature meter 38, a fuel empty lamp 40, a turn signal lamp 42, a clock display 44, and the like. The engine oil temperature meter 38 displays an engine oil temperature based on a signal provided by the engine oil temperature sensor 18. The fuel empty lamp 40 indicates the amount of fuel that is still available for use based on a signal provided by the fuel sensor 16. The turn signal lamp 42 turns on by being operatively connected to a turn signal switch (not shown). The clock display 44 displays the time-of-day.

Each of the trip meter 30, the odometer 32, the speedometer 34, the engine oil temperature meter 38, and the clock display 44 is an LCD displaying numerals from 0 to 9. For example, the representation of each digit is formed using a 7-segment display. Of these, the trip meter 30 gives a 4-digit display in units of 0.1 [km]. The odometer 32 gives a 5-digit display in units of 1 [km].

Figure 3:
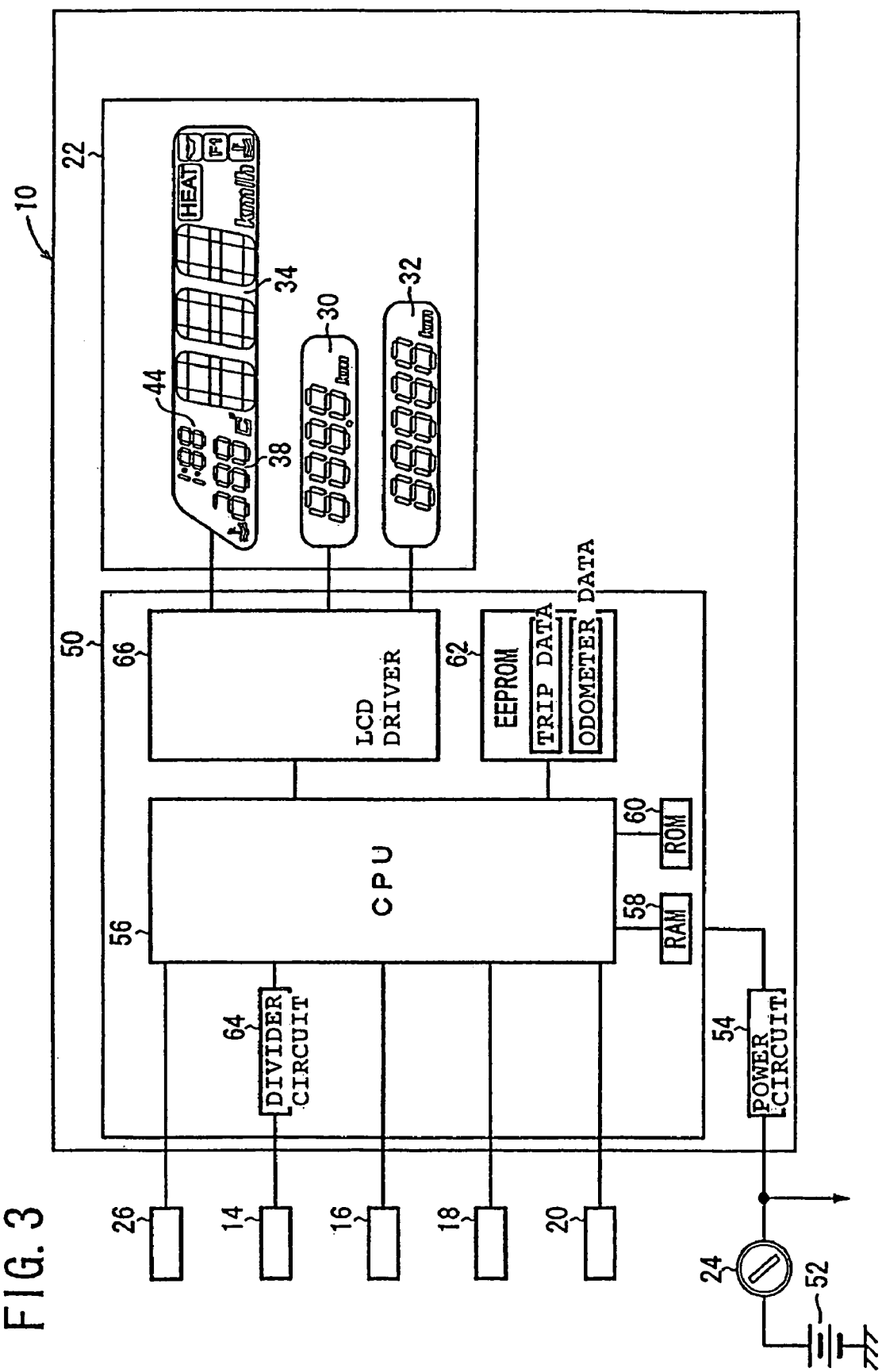
FIG. 3 is a functional block diagram of the mileage display system according to the preferred embodiment of the present invention showing the relationship between the CPU, the LDC driver, data storage, and the display unit.

Referring to FIG. 3, the mileage display system 10 includes a control unit 50 for controlling display of the liquid crystal displays (LCDs) including the trip meter 30, the odometer 32, and the like. The control unit 50 is energized by being operatively connected to the ignition switch 24. Specifically, the control unit 50 is energized as follows. That is, replenish of power supply is received from a battery 52 when the ignition switch 24 is turned on and electricity is supplied to the control unit 50 via a power circuit 54.

The control unit 50 includes a CPU (central processing unit) 56, a RAM (random access memory) 58, a ROM (read only memory) 60, an EEPROM (electrically erasable programmable read-only memory) 62, a divider circuit 64, and an LCD driver 66. The CPU 56 serves as an display controller. The RAM 58, the ROM 60, and the EEPROM 62 serve as recording units. The divider circuit 64 divides the pulse signal generated by the speed sensor 14 and supplies the signal to the CPU 56. The LCD driver 66 serves as an interface for displaying numeric data calculated by the CPU 56 on the LCDs. Of these components, the EEPROM 62 is nonvolatile recording means that can be reprogrammed repeatedly and retain recorded data even when the ignition switch 24 is turned off. The EEPROM 62 may be replaced by nonvolatile recording means of other types (e.g., a flash memory or the like).

The CPU 56 is, for example, a one-chip microprocessor. The CPU 56 reads predetermined data or a program recorded in the ROM 60 and executes the program. The CPU 56 also reads and writes data to/from the RAM 58 and the EEPROM 62. The CPU 56 can read, through the divider circuit 64, the pulse signal generated by the speed sensor 14 as described earlier. In addition, the CPU 56 can also read signals provided by the fuel sensor 16, the engine oil temperature sensor 18, the engine speed sensor 20, and the reset switch 26. The CPU 56 further includes a predetermined timer function. In FIG. 3, control means for controlling the tachometer 36, the fuel empty lamp 40, the turn signal lamp 42, and the like are omitted.

The operation of the mileage display system 10, arranged as described in the foregoing, will now be described with reference to FIGS. 4 through 9. The mileage display system 10 is operated as follows. When a key (not shown) is inserted in the ignition switch 24 and turned, power is supplied from the battery 52. This causes the CPU 56 of the control unit 50 to start operating. The CPU 56 reads the program recorded in the ROM 60 and executes the program, in order, starting with a portion recorded in a predetermined starting address. In practice, the LCDs of the mileage display system 10 are controlled by the control unit 50 and specific display contents of each of the LCDs can be varied according to the specific contents of the programs recorded in the ROM 60. The operation according to three different programs will be described sequentially hereunder. The program is executed in the numerical order of step numbers unless otherwise specified.

The first program is divided into two parts. The first part is an initial processing operation executed at first when the ignition switch 24 is turned on (see FIG. 4). The second part is an integration processing operation executed thereafter (see FIG. 6).

Figure 4:
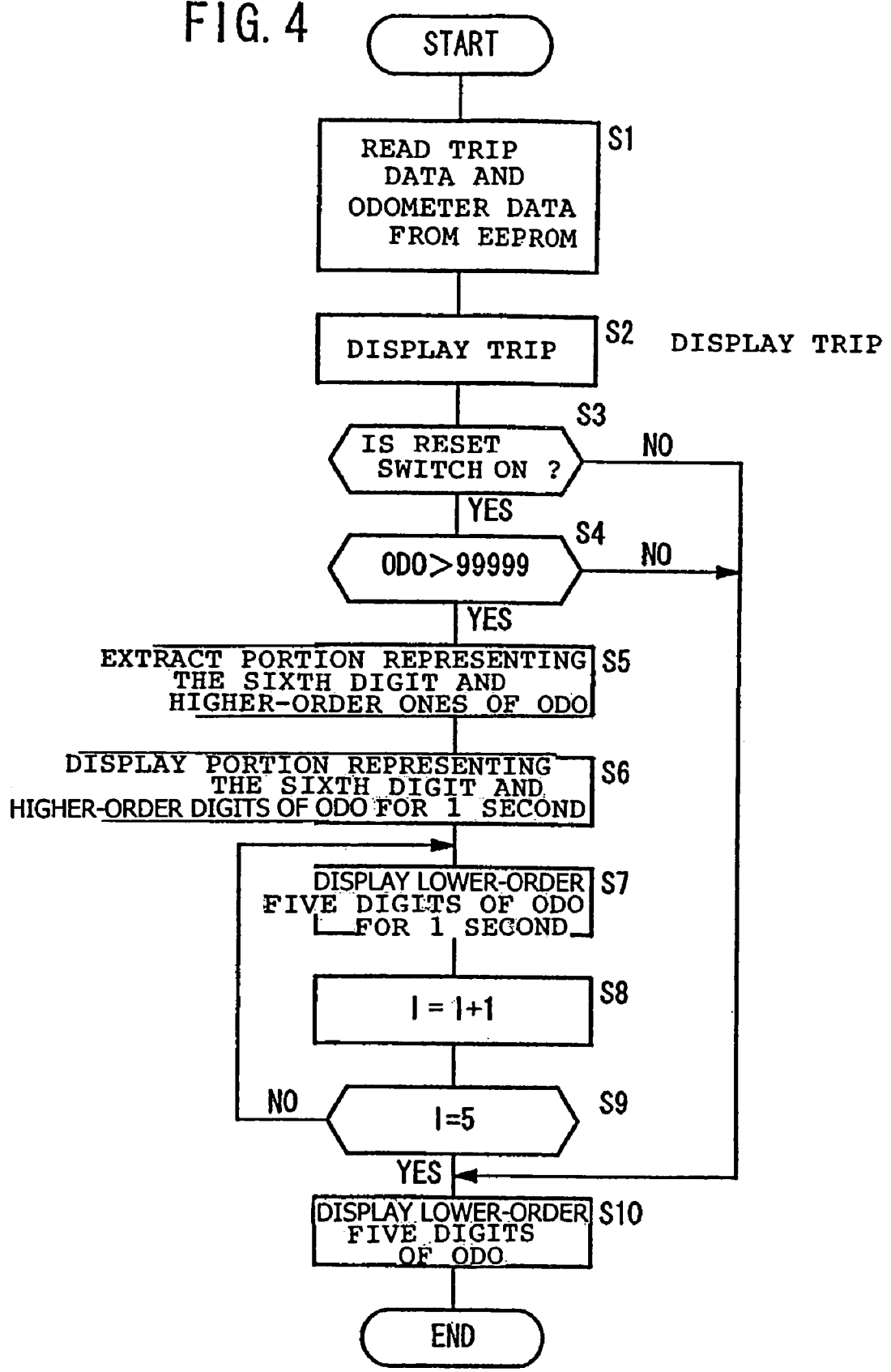
FIG. 4 is a flowchart of an initial processing operation performed when the mileage display system operates according to a first program.

Referring to FIG. 4, in the initial processing operation performed based on the first program, trip data and odometer data are read from the EEPROM 62 in the first step S1. The trip data and the odometer data form data on the accumulated mileage recorded in the integration processing operation to be described later. The data serves as the basis for display on the trip meter 30 and the odometer 32. The trip data can be reset as necessary to zero by the operation of the reset switch 26. The odometer data, on the other hand, remains unchanged even with the operation of the reset switch 26, indicating the total accumulated mileage of the motorcycle 12.

The trip data is in units of 0.1 [km] in accordance with the trip meter 30. The odometer data is in units of 1 [km] in accordance with the odometer 32. Hereafter, trip data values will be referred to as TRIP and odometer data values will be referred to as ODO. As an illustrative example, the description that follows is based on ODO=135224 [km] when the ignition switch 24 is turned on.

In step S2, TRIP is displayed on the trip meter 30. Specifically, TRIP, which is binary data, is translated to a corresponding decimal value and then information on a specific numeric value of each digit and a corresponding segment to be displayed is supplied to the LCD driver 66. The information on the segment is set such that the numeric value is right-justified when displayed.

In step S3, the signal of the reset switch 26 is checked. If the reset switch 26 is on, the operation proceeds to step S4. If the reset switch 26 is off, the operation proceeds to step S10. It should be noted that, since the execution time of step S1 and step S2 is extremely brief, the operation proceeds to step S4 if the reset switch 26 is on simultaneously when the ignition switch 24 is turned on.

In step S4, a check is made as to whether or not ODO exceeds 99999 which is the maximum 5-digit value to be displayed on the odometer 32. If ODO exceeds 99999, the operation proceeds to step S5. If ODO is equal to or less than 99999, the operation proceeds to step S10.

In step S5, a portion exceeding first the five digits of ODO corresponds to the numeric value of the digits of higher order than the number of display digits of the odometer 32. This portion is extracted and substituted for parameter ODO_A. Specifically, ODO_A is set equal to the integer of [ODO/100000]. If ODO is a 32-bit format, a decimal number of up to ten digits can be represented. The 6th to 10th digits of ODO are therefore extracted for ODO_A. Even more specifically, if ODO=135224 [km], then ODO_A=1.

In step S6, the parameter ODO_A is displayed in the odometer 32. The parameter ODO_A is displayed in the odometer 32 for one second through timer processing, and then the operation proceeds to step S7. That is, execution of step S6 causes the numeral "1", representing the portion of the 6th digit and higher-order digits of ODO, to be displayed in the odometer 32 for one second.

In step S7, parameter ODO_B representing the low-order five digits of ODO is obtained and displayed in the odometer 32. Specifically, the parameter ODO_B is set equal to [ODO−(ODO_A)×100000] and is displayed in the odometer 32 through the same processing as in step S2. After the parameter ODO_B has been displayed in the odometer 32 for one second through timer processing, the operation proceeds to step S8.

That is, execution of step S7 causes the numeral "35224", representing the portion of the low-order five digits of ODO, to be displayed in the odometer 32 for one second.

In step S8, a counter I having an initial reading of 0 is incremented by performing the operation I=I+1.

Figure 5:
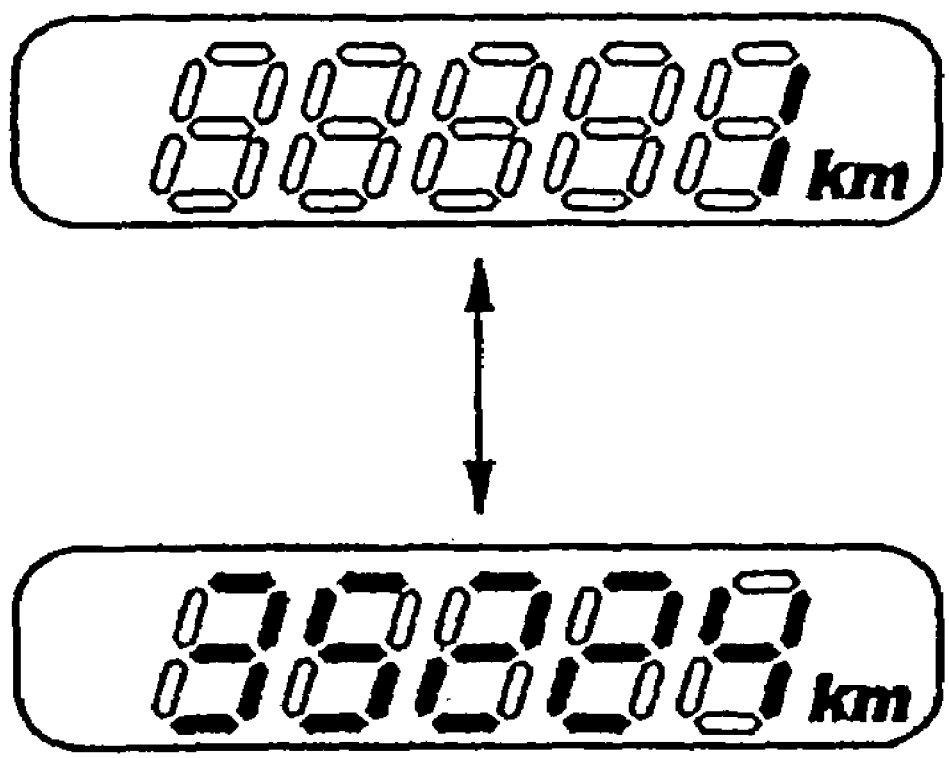
FIG. 5 is an isolated view of the odometer display showing changes in the display when the mileage display system operates according to the first program.

In step S9, it is determined as to whether or not the reading of the counter I has reached a value of 5. If I=5, the operation proceeds to step S10. If I<5, the operation returns to step S6. This results in steps S6 and S7 being executed five times repeatedly. As a consequence, as shown in FIG. 5, the portion representing the sixth digit and higher-order digits of ODO, or "1," and the portion representing the low-order five digits, or "35224," are alternately and repeatedly displayed one second each, for a total of ten seconds.

In step S10, the portion of the low-order five digits of ODO is redisplayed in the odometer 32 in the same manner as in step S7. Execution of step S10 completes the initial processing operation and the operation proceeds to the second part of the first program, the integration processing operation.

Figure 6:
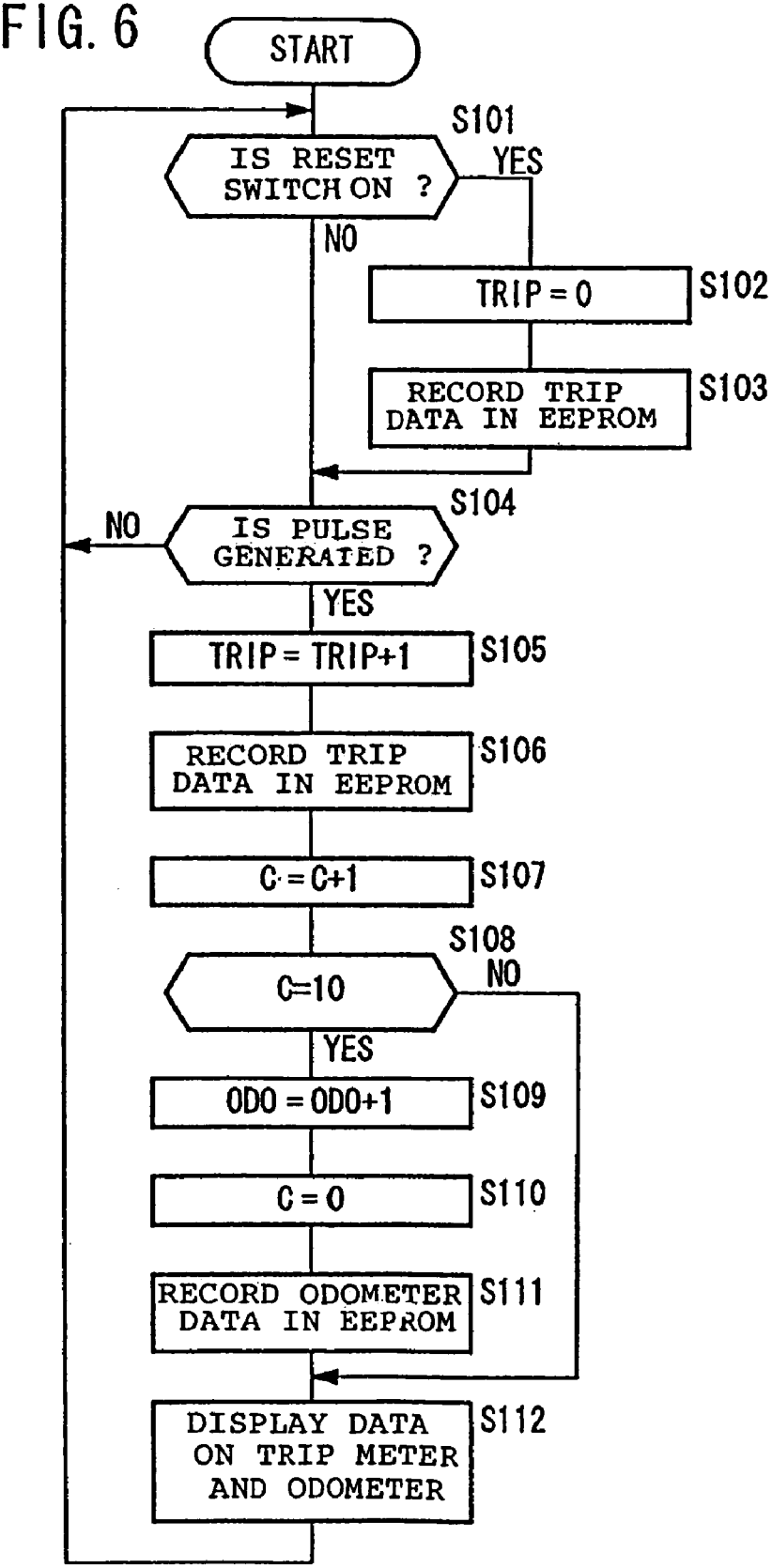
FIG. 6 is a flowchart of an integration processing operation performed when the mileage display system operates according to the first program.

Referring to FIG. 6, in the integration processing operation, the signal of the reset switch 26 is checked in the first step S101. If the reset switch 26 is on, the operation proceeds to step S102. If the reset switch 26 is off, the operation proceeds to step S104.

In step S102, the trip data is reset using the operation TRIP=0.

In step S103, the trip data, reset to 0, is recorded in the EEPROM 62.

In step S104, the signal of the divider circuit 64 is checked to determine whether or not a divided pulse is generated. If it is confirmed that the divided pulse has been generated, the operation proceeds to step S105. If it is determined that the divided pulse has not been generated, the operation returns to step S101. The divider circuit 64 divides the pulse generated by the speed sensor 14 and supplies the CPU 56 with one divided pulse for each distance driven of 0.1 [km].

In step S105, the trip data is incremented using the operation TRIP=TRIP+1.

In step S106, the trip data is recorded in EEPROM 62 and updated.

In step S107, a counter C having an initial reading of 0 is incremented using the operation C=C+1.

In step S108, it is determined as to whether or not the reading of the counter C has reached a value of 10. If C=10, the operation proceeds to step S109. If C<10, the operation proceeds to step S112.

In step S109, since the counter C, which is incremented in units of 0.1 [km], reads 10, the odometer data ODO in units of 1 [km] is incremented using the operation ODO=ODO+1.

In step S110, the counter C is reset using the operation C=0.

In step S111, the odometer data ODO is recorded in EEPROM 62 and updated. Even if at this time ODO is in the state of a mileage display overflow by exceeding 99999, which is the maximum 5-digit value to be displayed on the odometer 32, the ODO data is directly recorded in the EEPROM 62. That is, if ODO is evaluated as a decimal number, recording the portion representing the sixth digit and higher-order digits in the EEPROM 62 allows that particular portion to be used as information indicating the number of times the overflow has occurred (hereinafter referred to as an "overflow count"). In practice, ODO may be recorded in the EEPROM 62 as binary data without having to convert the same to a corresponding decimal number.

In step S112, the trip data TRIP is displayed in the trip meter 30 as in step S2. The lower-order 5-digit portion of ODO is also displayed in the odometer 32 as in step S10.

In step S112, the display may be changed as follows, between before and after the occurrence of the overflow, if the high-order digit of the numeric value to be displayed is 0. Specifically, if the low-order five digits of ODO read "00705," the high-order "0" may be omitted to give a display of the three digits of "705" before the occurrence of the overflow. After the occurrence of the overflow, a display of the complete five digits of "00705" may be given. This allows the occurrence of the overflow to be determined depending on whether "0" is displayed in the high-order digit, if the low-order five digits of ODO range from "00001" to "09999."

The operation thereafter returns to step S101. The operations of steps from S101 through S112 are then repeatedly executed until the ignition switch 24 is turned off. The EEPROM 62 takes a long time in recording data and also has a limited number of times it can be reprogrammed. In view of these limitations, the system can be configured to record data in a lump at one time when the ignition switch 24 is turned off, instead of recording the trip data and the odometer data in a step-by-step fashion as in steps S106 and S111, respectively. A predetermined power off delay circuit may herein be used to introduce a delay time in turning power off relative to the control unit 50 to allow this operation. Specifically, during this delay time, the control unit 50 is allowed to recognize that the ignition switch 24 has been turned off and then to record the trip data and the odometer data in a lump in the EEPROM 62. Further, the counter C may be recorded in the EEPROM 62 and counting be continued based on the reading of the counter C at the end of the last session.

Further, the system may also be configured to execute the operations of steps from S101 through S103, and from S104 through S12, through an interrupt of an on signal of the reset switch 26 and a divided pulse of the divider circuit 64, respectively.

As described in the foregoing, according to the operations performed by the first program, the mileage display system 10 records ODO as is in the EEPROM 62 when ODO exceeds 99999 which is the maximum 5-digit value to be displayed on the odometer 32. In step S4, a comparison is made of ODO with a threshold value 999999. If ODO>99999, the portion representing the sixth digit and higher-order digits of ODO is displayed in the odometer 32, which allows the operator to recognize the overflow count.

Since the overflow count is displayed in the odometer 32, there is no need of providing additional meters or display digits. The mileage display system 10 can therefore be built compactly and at low cost. In particular, in the motorcycle 12, air resistance must be taken into consideration because the mileage display system 10 receives wind from the forward direction. The inventive displays system keeps the body of the mileage display system 10 compact, and thus avoids increased air resistance associated with a larger display unit.

The display of the overflow count is enabled only if the reset switch 26 is turned on simultaneously when the ignition switch 24 is turned on. The operator is thus provided with a choice of whether to display or not to display the overflow count as he or she desires. Moreover, the reset switch 26, which has conventionally been made available, can also serve as an interface for giving instructions of the operator's intention whether he or she likes to display the overflow count or not. Using the reset switch for multiple functions suppresses the manufacturing costs of the display unit.

The display of the overflow count is brief since it extends only for the first one second. Therefore, the display does not obstruct the view of the operator. In practice, setting the display time of the overflow count to three seconds or less will prevent the display from obstructing the view of the operator. More preferably, the time should be set in the range of 0.5 seconds to 3 seconds.

The odometer data represents the total accumulated mileage of the motorcycle 12, requiring no frequent check. It is sufficient to allow the operator to check an accurate value for a predetermined period of time immediately after the ignition switch 24 has been turned on.

Further, if an operation is performed in which an RF false pulse is applied to the divider circuit 64, instead of the pulse generated by the speed sensor 14, causing a mileage display overflow to occur. Even if this happens, the information that the overflow has occurred (that is, the portion representing the sixth digit and higher-order digits of ODO) is recorded in the EEPROM 62 and that overflow count can be displayed. Illegal odometer tampering can therefore be prevented.

The odometer 32 in the mileage display system 10 is capable of displaying a value greater than the actual number of digits. A hardware modification may therefore be made to make the number of display digits smaller (e.g., four digits).

The operation of the mileage display system according to the second program will now be described. The second program employs the same integration processing operation as that performed in the first program. The second program differs from the first program in the initial processing operation only.

Figure 7:
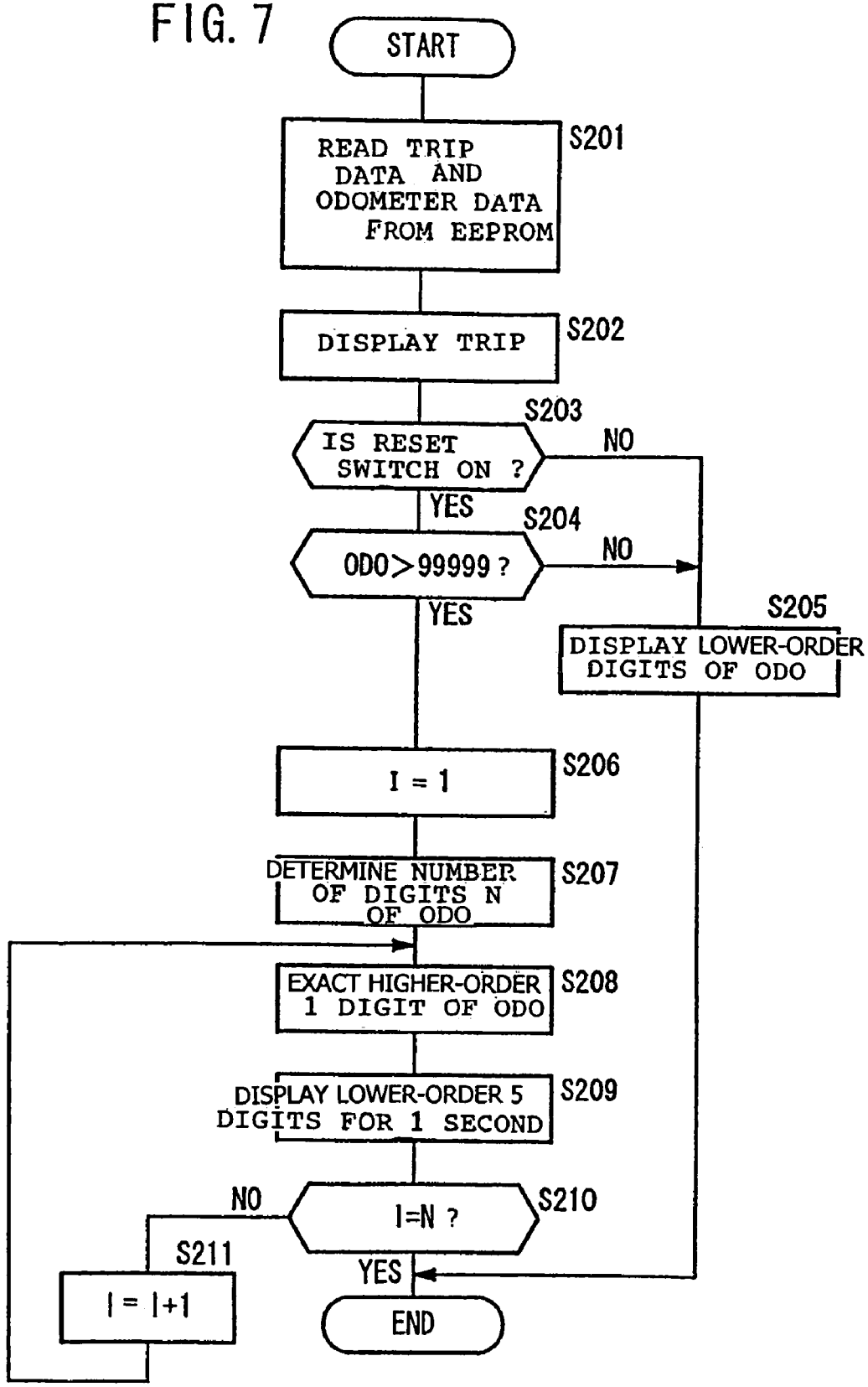
FIG. 7 is a flowchart of an initial processing operation performed when the mileage display system operates according to a second program.

Referring to FIG. 7, in the initial processing operation according to the second program, operations performed in the first steps from S201 through S204 are the same as those performed in steps S1 through S4 of the first program. If conditions of branch decisions to be made in step S203 and step S204 are not met, the operation proceeds to step S205. In step S205, the lower-order five digits of ODO are displayed in the odometer 32 to complete the initial processing operation. If the condition of the branch decision made in step S204 is met, on the other hand, the operation proceeds to step S206.

In step S206, 1 is substituted for the initial value of the counter I.

In step S207, the number of digits N of ODO at that time is determined. For example, if ODO=135224 in decimal notation, N is set to a value of 6.

In step S208, the $I^{th}$ higher order digits of ODO are extracted and substituted for a predetermined parameter P. The counter I is in the initial state I=1 and ODO=135224 [km]. Hence, P=I.

Since the counter I is later incremented in step S211, the parameter P is updated each time step S208 is executed. Specifically, each time the counter I is incremented as I=1, 2, 3, 4, 5, and 6, the parameter P is updated as P=1, 13, 135, 1352, 13522, and 135224, respectively. The $I^{th}$ higher order digits of ODO are extracted through the same procedure as described in step S5.

In step S209, the lower-order five digits of the parameter P are displayed in the odometer 32. Specifically, if I is less or equal to than 5, the parameter P value is directly displayed in the odometer 32. If I is greater than 5, the lower-order five digits of the parameter P, or "35224," is displayed in the odometer 32. The value is displayed for one second through timer processing, and then the operation proceeds to step S210.

In step S210, the counter I is compared with the number of digits N. If I<N, the operation proceeds to step S211. If I=N, the initial processing operation is completed and the operation proceeds to the integration processing operation (see FIG. 5).

In step S211, the counter I is incremented using the operation I=I+1. Then the operation proceeds to step S208.

Figure 8:
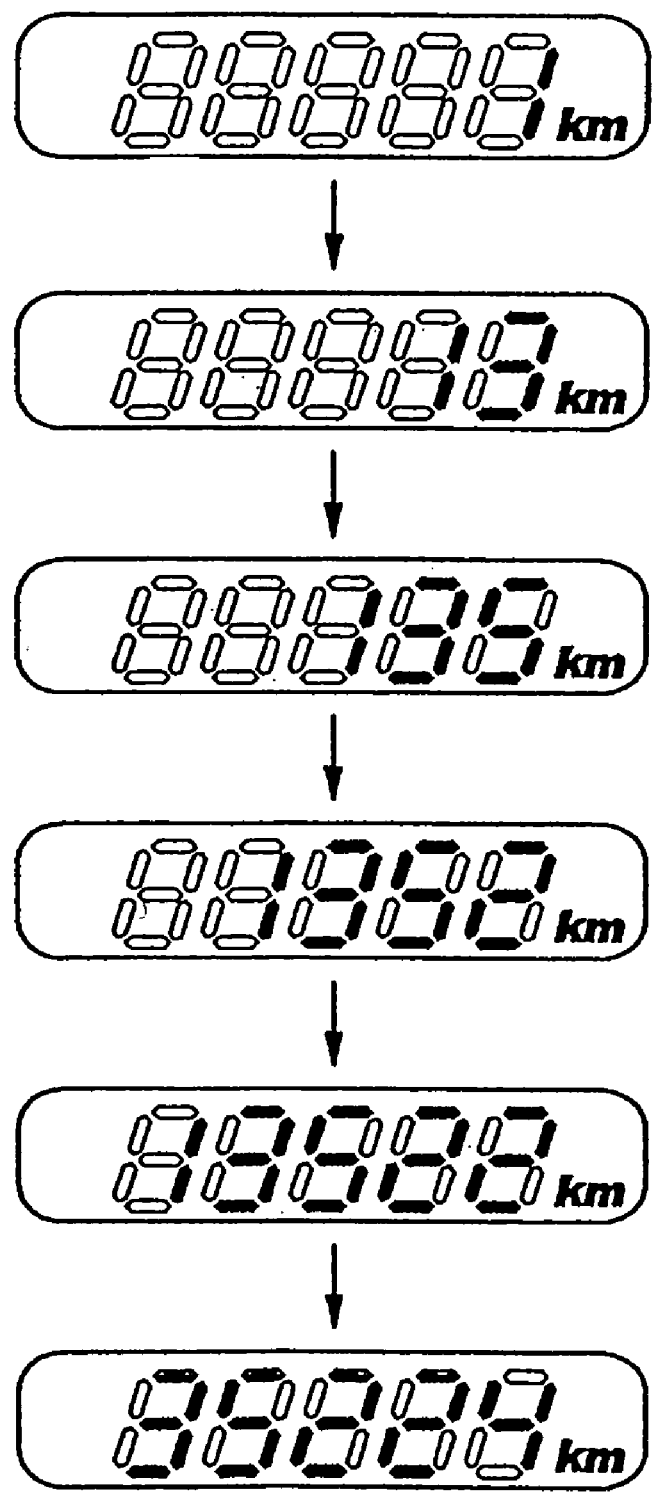
FIG. 8 is an isolated view of the odometer display showing changes in the display when the mileage display system operates according to the second program.

In the initial processing operation according to the second program, steps from S208 through S211 are repeatedly executed based on the value of the counter I as described in the foregoing. This causes the odometer data ODO that scrolls from the highest-order digit toward lower-order digits to be displayed in the odometer 32. Specifically, the following values are displayed sequentially at one-second intervals as shown in FIG. 8: "1", "13", "135", "1352", "13522", and "35224". The operator can therefore recognize an accurate odometer data value even if ODO includes six digits or more. Moreover, the odometer data is displayed through scrolling which is extremely simple and easily recognizable. The operator can therefore recognize the odometer data of six digits or more without having to consult with an operator's manual or the like to understand operation of the display unit.

The operation of the mileage display system according to the third program will now be described. The third program employs the same integration processing operation as that performed in the in the first program. The third program differs from the first program in the initial processing operation only.

Referring to FIG. 9, in the initial processing operation according to the third program, operations performed in the first steps of S301 and S302 are the same as those performed in steps S1 and S2 of the first program. The operation of step S3 (reset switch check) is omitted. Regardless of whether the reset switch 26 is on or off, operations of step S303 and onward are executed.

In step S303, ODO is compared with the threshold 99999 as in step S4. If ODO exceeds 99999, the operation proceeds to step S304. If ODO is less than or equal to 99999, the operation proceeds to step S306.

In step S304, the portion representing the sixth digit and higher-order digits of ODO is extracted and substituted for the parameter ODO_A as in step S5.

In step S305, the parameter ODO_A is displayed in the odometer 32 as in step S6 for a period of one second. The operation then proceeds to step S306.

In step S306, the parameter ODO_B, indicating the low-order five digits of ODO, is obtained and displayed in the odometer 32. Thereafter, the initial processing is terminated and the operation proceeds to the integration processing operation (see FIG. 5).

As described in the foregoing, in the initial processing operation according to the third program, the portion representing the sixth digit and higher-order ones of ODO is displayed automatically in the odometer 32 for one second when the ignition switch is turned on. This allows an accurate value of ODO comprising six digits or more to be recognized with the five-digit odometer 32. In addition, the portion representing the sixth digit and higher-order digits of ODO is displayed regardless of whether the reset switch 26 or the like is operated or not. This eliminates the need for referring to an operator's manual or the like in order to understand operation of the display unit.

It should be noted that parts of the functions offered by the first to third programs may be combined together or omitted. For example, step S203 in the second program for determining the state of the reset switch 26 may be omitted.

In step S111, ODO indicating the accumulated mileage is directly recorded in the EEPROM 62. The low-order five digits of ODO and the portion representing the sixth digit and higher-order digits of ODO may nonetheless be recorded separately. In this case, too, the portion representing the sixth digit and higher-order digits of ODO can be displayed as information showing the overflow count.

It should be understood that the foregoing preferred embodiment of the present invention is described by way of an example and that various changes and modifications may be made in the present invention without departing from the spirit and scope thereof.

We claim:

1. In a vehicle of a type having an ignition switch, an improvement comprising a mileage display system for displaying an accumulated mileage traveled by the vehicle, the mileage display system comprising:

a main odometer having a display face capable of displaying a predetermined number of display digits as a normal display;

a display controller operatively connected to the ignition switch of the vehicle and operable to calculate the accumulated mileage by counting a pulse signal produced according to movement of the vehicle; and a memory unit for recording the accumulated mileage;

wherein the display controller is operable to record the accumulated mileage in the memory unit during vehicle operation and to display the accumulated mileage on the display face, and if the accumulated mileage recorded in the memory unit exceeds a maximum value, established by the predetermined number of display digits, when the ignition switch is operated, the display controller is operable to display a numeric value of higher order than the normal display on the main odometer, for a predetermined period of time, as an enhanced display.

2. The mileage display system of claim 1, wherein the display controller, after a lapse of the predetermined period of time, displays the normal display on the main odometer, corresponding to the lower-order digits of the accumulated mileage.

3. The mileage display system of claim 1, wherein the display controller is operable to alternate a predetermined number of times between the normal display and the enhanced display on the main odometer.

4. The mileage display system of claim 1, wherein the display controller is operable to display a value of the accumulated mileage that scrolls from the highest-order digit toward lower-order digits on the main odometer.

5. In a vehicle of a type having an ignition switch, an improvement comprising a mileage display system for displaying an accumulated mileage traveled by the vehicle, the mileage display system comprising:
a main odometer having a display face capable of displaying a predetermined number of display digits as a normal display;
a display controller operatively connected to the ignition switch of the vehicle and operable to calculate the accumulated mileage by counting a pulse signal produced according to movement of the vehicle; and
a memory unit for recording the accumulated mileage;
a reset switch;
a trip odometer for displaying an accumulated mileage accrued by the vehicle, the trip odometer operable to be reset to zero when the reset switch is operated;
wherein the display controller is operable to record the accumulated mileage in the memory unit and,
if the reset switch is simultaneously operated when the ignition switch is operated, and if the accumulated mileage recorded in the memory unit exceeds a maximum value of display as established by the predetermined number of display digits, the display controller causes the main odometer to display, for a predetermined period of time, a numeric value of digits of higher order than the predetermined number of display digits, as an enhanced display, to show the accumulated mileage.

6. The mileage display system of claim 5, wherein the display controller, after a lapse of the predetermined period of time, displays the normal display on the main odometer, corresponding to the lower-order digits of the accumulated mileage.

7. The mileage display system of claim 5, wherein the display controller is operable to alternate a predetermined number of times between the normal display and the enhanced display on the main odometer.

8. The mileage display system of claim 5, wherein the display controller is operable to display a value of the accumulated mileage that scrolls from the highest-order digit toward lower-order digits on the main odometer.

9. The mileage display system of claim 5, wherein the vehicle comprises a power off delay circuit, and wherein when the ignition switch is turned off, the power off delay circuit operates for a predetermined period of delay time, and the memory unit records the accumulated mileage during said predetermined period of delay time.

10. The mileage display system of claim 5, wherein the enhanced display appears on the main odometer for a period of time in the range of 0.5 seconds to three seconds.

11. The mileage display system of claim 5, wherein the predetermined number of display digits comprises four.

12. A method of displaying accumulated mileage on a vehicle having an ignition switch and a mileage display system for displaying an accumulated mileage traveled by the vehicle, the mileage display system comprising a main odometer having a display face capable of displaying a predetermined number of display digits as a normal display, wherein said method comprises the steps of:
counting a pulse signal produced according to movement of the vehicle;
calculating the accumulated mileage traveled by the vehicle based on the pulse signal count, using a display controller;
displaying the accumulated mileage on the display face of the main odometer as a normal display; and
storing a value corresponding to the accumulated mileage in a memory unit;
wherein the display controller periodically updates the stored value corresponding to the accumulated mileage in the memory unit during vehicle operation, and
if the accumulated mileage recorded in the memory unit exceeds a maximum value, established by the predetermined number of display digits, when the ignition switch is operated, displaying a numeric value of higher order than the normal display on the main odometer, for a predetermined period of time, as an enhanced display.

13. The mileage display method of claim 12, wherein the display controller, after a lapse of the predetermined period of time, displays the normal display on the main odometer, corresponding to the lower-order digits of the accumulated mileage.

14. The mileage display method of claim 12, wherein the display on the display face of the main odometer is alternated a predetermined number of times between the normal display and the enhanced display.

15. The mileage display method of claim 12, wherein the display controller causes a value of the accumulated mileage that scrolls from the highest-order digit toward lower-order digits on the main odometer to be displayed on the main odometer.

16. A method of displaying accumulated mileage on a vehicle having an ignition switch and a mileage display system for displaying an accumulated mileage traveled by the vehicle, the mileage display system comprising a main odometer having a display face capable of displaying a predetermined number of display digits as a normal display, and a trip odometer operatively associated with a reset switch, wherein said method comprises the steps of:
counting a pulse signal produced according to movement of the vehicle;
calculating the accumulated mileage traveled by the vehicle based on the pulse signal count, using a display controller;

displaying the total accumulated mileage of the vehicle on the display face of the main odometer as a normal display;

displaying an accumulated trip mileage accrued by the vehicle on the trip odometer, the trip odometer operable to be reset to zero when the reset switch is operated; and storing a value corresponding to the accumulated mileage in a memory unit;

wherein the display controller periodically updates the stored value corresponding to the accumulated mileage in the memory unit during vehicle operation, and if the reset switch is simultaneously operated when the ignition switch is operated, and if the accumulated mileage recorded in the memory unit exceeds a maximum value of display as established by the predetermined number of display digits, displaying, for a predetermined period of time, a numeric value of digits of higher order than the predetermined number of display digits, as an enhanced display, to show the accumulated mileage.

17. The method of claim 16, wherein the display controller, after a lapse of the predetermined period of time, displays the normal display on the main odometer, corresponding to the lower-order digits of the accumulated mileage.

18. The method of claim 16, wherein the display on the display face of the main odometer is alternated a predetermined number of times between the normal display and the enhanced display.

19. The method of claim 16, wherein the display controller displays a value of the total accumulated mileage that scrolls from the highest-order digit toward lower-order digits on the main odometer.

20. The method of claim 16, wherein the vehicle comprises a power off delay circuit, and wherein when the ignition switch is turned off, the power off delay circuit operates for a predetermined period of delay time, and the memory unit records the accumulated mileage during said predetermined period of delay time.

21. The method of claim 16, wherein the enhanced display appears on the main odometer for a period of time in the range of b 0.5 seconds to three seconds.

* * * * *